(12) United States Patent
Wibbing

(10) Patent No.: US 11,299,249 B2
(45) Date of Patent: Apr. 12, 2022

(54) PROPULSION SYSTEM FOR HIGHLY MANEUVERABLE AIRSHIP

(71) Applicant: Daniel Wibbing, Ostfildern (DE)

(72) Inventor: Daniel Wibbing, Ostfildern (DE)

( * ) Notice: Subject to any disclaimer, the term of this patent is extended or adjusted under 35 U.S.C. 154(b) by 579 days.

(21) Appl. No.: 16/163,673

(22) Filed: Oct. 18, 2018

(65) Prior Publication Data

US 2020/0122813 A1    Apr. 23, 2020
US 2022/0048609 A9    Feb. 17, 2022

Related U.S. Application Data

(60) Provisional application No. 62/574,532, filed on Oct. 19, 2017.

(51) Int. Cl.
*B64B 1/26* (2006.01)
*B64B 1/12* (2006.01)
*B64B 1/30* (2006.01)

(52) U.S. Cl.
CPC ............... *B64B 1/26* (2013.01); *B64B 1/12* (2013.01); *B64B 1/30* (2013.01)

(58) Field of Classification Search
CPC .... B64B 1/26; B64B 1/24; B64B 1/30; B64B 1/28; B64B 2201/00
See application file for complete search history.

(56) References Cited

U.S. PATENT DOCUMENTS

| 1,457,024 A |   | 5/1923 | Franzen  |           |
|-------------|---|--------|----------|-----------|
| 1,817,274 A | * | 8/1931 | Schuette | B64B 1/00 |
|             |   |        |          | 244/55    |
| 1,879,345 A | * | 9/1932 | Lawrence | B64B 1/00 |
|             |   |        |          | 244/26    |

(Continued)

FOREIGN PATENT DOCUMENTS

| DE | 102004005737 A1 | * | 10/2005 | ............... B64B 1/08 |
| WO | WO-0047468 A1   | * | 8/2000  | ............... B64B 1/36 |

(Continued)

OTHER PUBLICATIONS

AcerobotX Inc. (n.d.). Home [YouTube channel]. YouTube. Retrieved Jan. 5, 2021, from https://www.youtube.com/channel /UCBQ-6dG1xubKgnXz9xdFHLIA.

(Continued)

*Primary Examiner* — Joshua J Michener
*Assistant Examiner* — Cindi M Curry
(74) *Attorney, Agent, or Firm* — Edell, Shapiro & Finnan, LLC

(57) ABSTRACT

A propulsion system for omnidirectional maneuverability and efficient forward flight of an airship. The propulsion system includes only fixed, unidirectional engines (17, 19, 20). Thrust vectors of the fixed engines (19, 20) are oriented in a way that their speeds can be chosen such that all forces acting on the airship (i.e., engine thrusts, gravity, buoyancy, wind and potentially others) together result in the desired motion. The engines may be four ducted fans (17) at the bow of the aircraft and four ducted fans (19) at the stern of the aircraft. The thrust vectors of the engines can be decomposed into three vectors of equal length that are each parallel to one of the three axes of a Cartesian coordinate system. Efficient forward flight is achieved by an additional engine (20) at the stern of the airship.

16 Claims, 6 Drawing Sheets

(56) References Cited

U.S. PATENT DOCUMENTS

| | | | | |
|---|---|---|---|---|
| 3,127,132 | A * | 3/1964 | Grady | B64B 1/00 |
| | | | | 244/55 |
| 4,402,475 | A * | 9/1983 | Pavlecka | B64B 1/36 |
| | | | | 244/29 |
| 5,026,003 | A | 6/1991 | Smith | |
| 5,449,129 | A | 9/1995 | Carlile et al. | |
| 7,891,603 | B2 * | 2/2011 | Voorhees | B64B 1/30 |
| | | | | 244/29 |
| 8,696,393 | B2 * | 4/2014 | Power | B63H 11/08 |
| | | | | 440/40 |
| 2009/0200416 | A1 * | 8/2009 | Lee | B64B 1/32 |
| | | | | 244/30 |
| 2015/0078620 | A1 | 3/2015 | Ledergerber et al. | |
| 2018/0022461 | A1 * | 1/2018 | Nunes | B64C 39/024 |
| | | | | 244/26 |

FOREIGN PATENT DOCUMENTS

| | | | | |
|---|---|---|---|---|
| WO | WO-2017022209 | A1 * | 2/2017 | B64C 39/00 |
| WO | WO-2019172808 | A1 * | 9/2019 | F02K 9/84 |

OTHER PUBLICATIONS

Johannes Eißing, Facebook Group Discussion posts, posted Apr. 2015, "Small Airship Union (SASU) Discussion Group," 5 pages, Retrieved (n.d.) from Internet: https://www.facebook.com/groups/smallairshipunion/permalink/436456076516356.

Norris, G., "Hybrid Hopes: An Inside Look At The Airlander 10 Airship", Aviation Week & Space Technology, May 15, 2015, http://aviationweek.com/technology/hybrid-hopes-inside-look-airlander-10-airship.

* cited by examiner

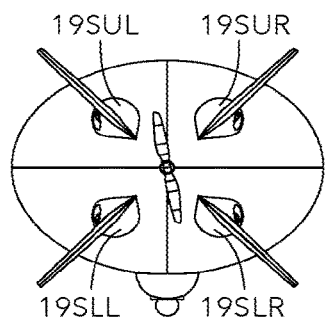
FIG.3A back view
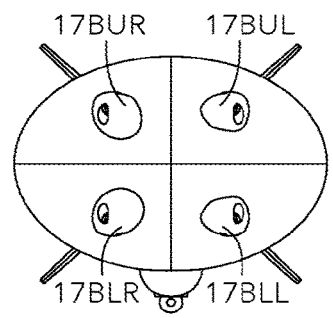
FIG.3B front view
FIG.4A side view
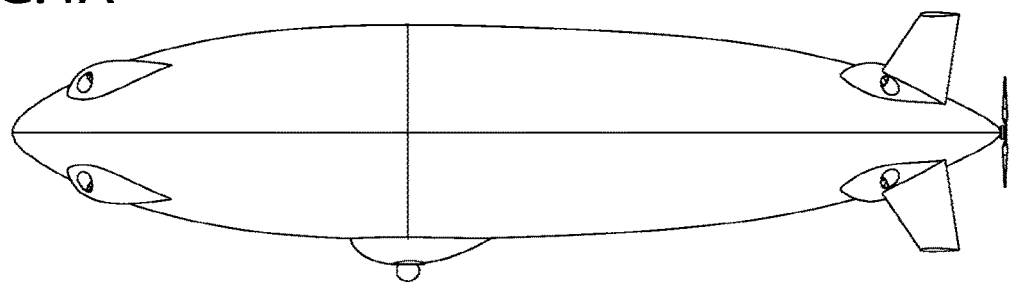
FIG.4B top view
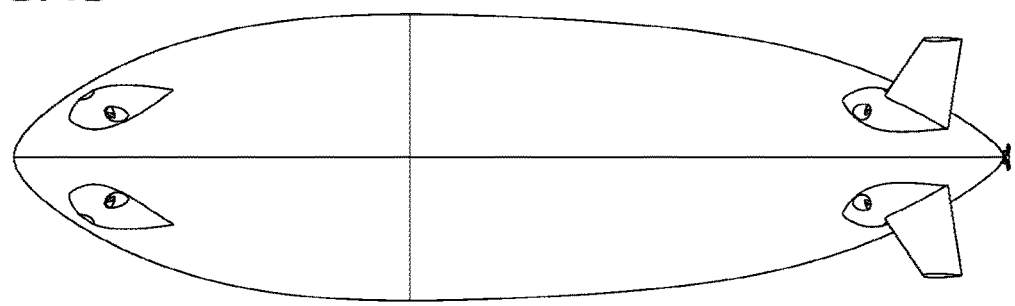

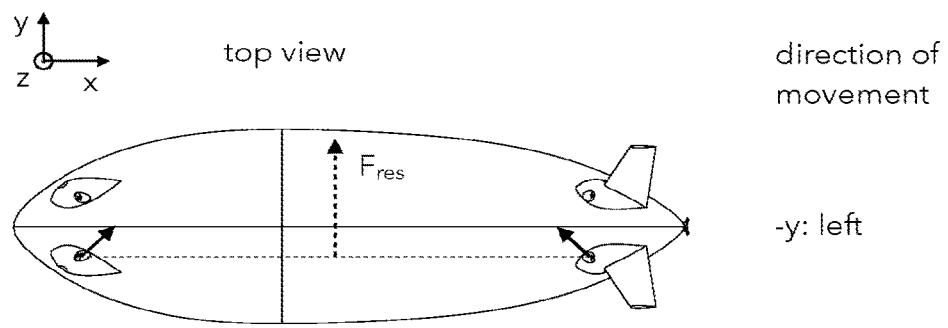
FIG.5A  -y: left
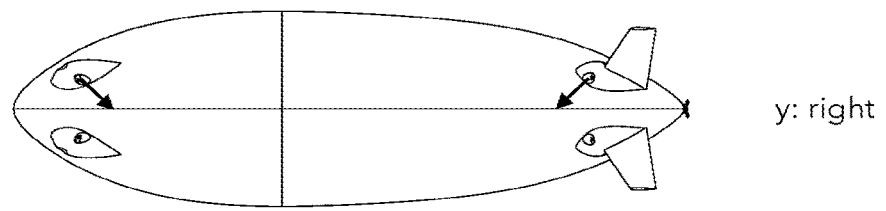
FIG.5B  y: right
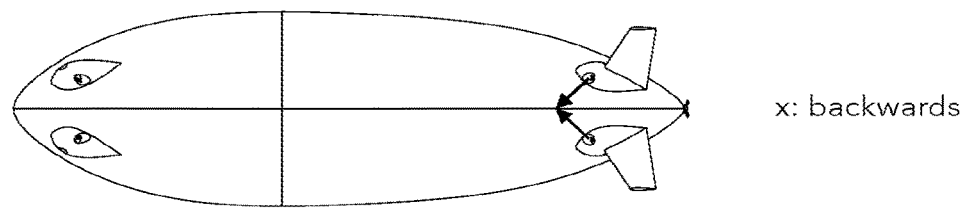
FIG.6A  x: backwards
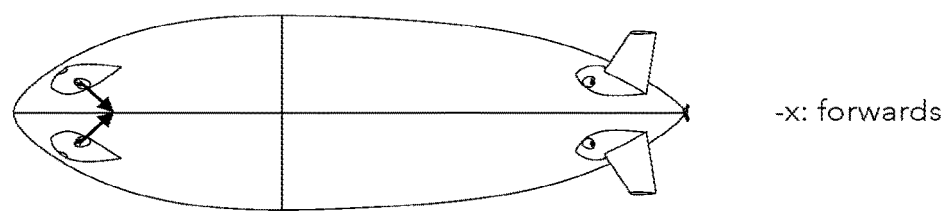
FIG.6B  -x: forwards

PROPULSION SYSTEM FOR HIGHLY MANEUVERABLE AIRSHIP

CROSS REFERENCE TO RELATED APPLICATION

The present application is a non-provisional application based on and claiming priority from U.S. Provisional Application No. 62/574,532, entitled "Propulsion System For Highly Maneuverable Airship" filed Oct. 19, 2017, the disclosure of which is incorporated by reference in its entirety.

TECHNICAL FIELD

The present invention relates generally to lighter-than-air vehicles. More specifically, the present invention relates to propulsion systems for lighter-than-air vehicles.

BACKGROUND OF THE INVENTION

Most existing propulsion systems for airships can be divided into three categories:
Swiveled engines
Pitch-adjusted propeller blades
Fixed engines
  in direct air flow
  in combination with thrust redirecting ducts or tubes
  in combination with thrust redirecting vanes While these propulsion systems may effectively function to control the flight of airships, they each have their disadvantages. For example:

Airship propulsion systems with swiveled engines, such as those described in U.S. Pat. No. 5,449,129 (Carlile) and U.S. Patent Publication No. 2015/0078620 (Ledergender et al.), have two main disadvantages:
  Swiveling and thus changing the direction of thrust takes some time. Immediately reacting to gusts of wind or other fast maneuvers are hardly possible that way.
  Additional actuators are necessary to cause the swivel movement. Weight, energy consumption and complexity increase compared to fixed engine concepts.

In airship propulsion systems utilizing pitch-adjusted propeller blades, the propeller blades are used to reverse the direction of thrust of a propeller. The mechanical structures required to change the pitch of each blade of a propeller are complex and introduce many additional parts that increase the chance of a system failure. In order to actuate the pitch adjusting gears and levers, a separate motor is required which increases weight and energy consumption. Finally, the shape of the blades cannot be optimized for producing thrust in the forward direction. Instead, a compromise has to be found in order to produce a significant amount of thrust in the reversed direction as well.

Airship propulsion systems utilizing the fixed engine concepts, like the one described in U.S. Pat. No. 5,026,003 (Smith), have the disadvantage that they do not allow for a movement of the airship in all six degrees of freedom. Most of these concepts lack the ability to move the airship in the lateral direction (left/right).

Even though U.S. Pat. No. 4,402,475 (Pavlecka) describes thrusters at the bow and stern of an airship, the thrusters are only intended as control thrusters for correcting the attitude of the airship instead of a missing empennage. Using the bow and stern thrusters in order to cause a lateral (sidewards crabbing) movement is not considered. Vertical thrusters are described for augmentation of static lift of the airship, but not for increasing maneuverability. Thrusters to propel the airship forwards or backwards are not described. Moreover, omnidirectional maneuverability is not achievable by the suggested concept.

Although U.S. Pat. No. 1,457,024 (Franzen) discusses the use of fixed engines mounted inside of ducts leading throughout the entire airship body in order to redirect the thrust of the engines, Franzen does not describe how an omnidirectional maneuverability of the airship is achievable by an arrangement of these ducts. The long ducts cause a lot of friction for the air that is propelled through them, making the propulsion very inefficient. Actuators for opening and closing the ducts are required in order to achieve a resulting thrust in the desired direction, thus increasing complexity, weight and power consumption.

In an article by Guy Norris, entilted "Hybrid Hopes: An Inside Look at the Airlander 10 Airship," Aviation Week, May 15, 2015, the Airlander, a hybrid airship by Hybrid Air Vehicles Limited, is described as utilizing fixed engines in combination with thrust redirecting vanes. However, the engine arrangement used does not allow for a lateral movement of the airship. Tilting the vanes still takes some time, the tilting angle is limited to less than 90°, and in the tilted position the vanes are not able to redirect the complete amount of propelled air into the desired direction, thus decreasing the efficiency of the concept.

In a discussion in Facebook group "Small Airship Union," April 2015; Johannes Eißing described in loose terms how a propulsion concept with fixed engines could look like that would enable a movement in almost all directions. However, this concept again has three significant drawbacks:
  It does not allow for a backwards movement.
  It only describes the engine orientation to be 45° relative to the longitudinal and vertical axis of the airship, which is not ideal for some applications and is not the only orientation possible.
  The efficiency of a forward flight is reduced because the thrust vectors that have to be activated for this motion partially cancel each other out.

SUMMARY OF THE INVENTION

In order to eliminate the disadvantages of the existing propulsion concepts, like those described above, embodiments of a fixed engine concept are described herein that enable near-instantaneous movements of an airship in all directions without having to rotate into a special direction first and without having to reverse the thrust of any engine. This is especially new for movements in lateral directions, i.e., for movements in the yz-plane of the Cartesian coordinate system relative to the airship (see, e.g., FIG. 1). The advantages of this near-instantaneous omnidirectional maneuverability is the ability to closely follow a pre-defined path in any direction and to precisely hold a position even under windy conditions. This is an ability that has previously only been achieved by multirotor aerodynes.

In further embodiments, high maneuverability and efficient forward flight are both possible, as opposed to previous engine concepts that involved a trade-off between these two objectives. These flight characteristics are achieved, for example, in a first embodiment of the propulsion system that uses eight ducted fans 17 and 19 and a stern engine 20 (see FIG. 1).

All embodiments have in common that the thrust vector of each engine is pointing in one fixed direction, and at all times engine speeds can be chosen such that all forces acting on the airship (i.e., engine thrusts, gravity, buoyancy, wind and potentially others) are together resulting in the desired motion.

BRIEF DESCRIPTION OF THE DRAWINGS

These and other advantages of the present invention will be better understood by reference to the drawings wherein:

FIG. 3A is a back view of the airship of FIG. 1 illustrating orthographic projections of the engine arrangement on the airship.

FIG. 3B is a front view of the airship of FIG. 1 illustrating orthographic projections of the engine arrangement on the airship.

FIG. 4A is a side view of the airship of FIG. 1 illustrating orthographic projections of the engine arrangement on the airship.

FIG. 4B is a top view of the airship of FIG. 1 illustrating orthographic projections of the engine arrangement on the airship.

FIGS. 5A, 5B, 6A and 6B are top views of the airship of FIG. 1 illustrating the active engines for movements to the left, right, back and front, respectively.

LIST OF REFERENCE NUMERALS

Figure 1:
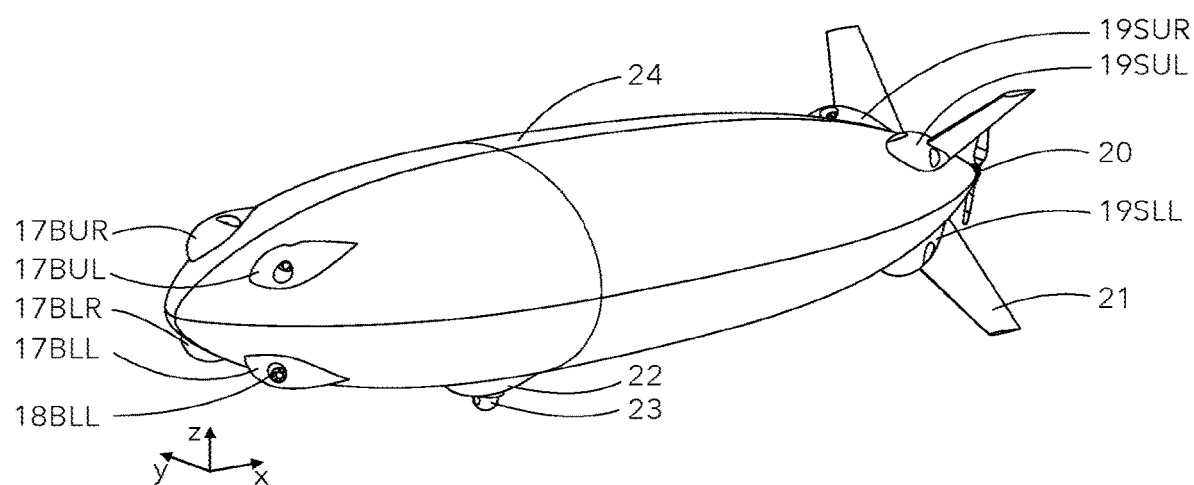
FIG. 1 is a perspective view illustrating the engine concept on an airship in three dimension in accordance with an aspect of the present invention.

The reference numbers discussed herein stand for the following:
17 ducted fans (in streamlined housings at bow of airship)
17BUR ducted fan at the bow upper right position
17BUL ducted fan at the bow upper left position
17BLR ducted fan at the bow lower right position
17BLL ducted fan at the bow lower left position
18 duct for inlet and outlet of air in streamlined engine housing
18BLL duct for inlet and outlet of air at the bow lower left position
19 ducted fans (in streamlined housings at stern of airship)
19SUR ducted fan at the stern upper right position
19SUL ducted fan at the stern upper left position
19SLL ducted fan at the stern lower left position
19SLR ducted fan at the stern lower right position
20 stern engine
21 fins
22 gondola
23 sensor
24 hull

DETAILED DESCRIPTION OF THE INVENTION

Static Structure and Function

The figures presented herein relate to a first embodiment and a simple version of a model and a control system for the airship propulsion system in accordance with an aspect of the present invention. Regarding the latter control system, it will be described in further detail hereinbelow.

As shown in FIG. 1, there are nine engines mounted to the elongated hull 24 of the airship. There are eight ducted fans 17 and 19 and one propeller engine 20 at the stern. There are two groups of ducted fans, four ducted fans 17 near the bow and four ducted fans 19 near the stern of the airship hull 24. One of the four ducted fans at the stern is not numbered since it is not visible in the three dimensional view of the airship in FIG. 1.

The ducted fans 17 and 19 each consist of a streamlined housing in the shape of a half-teardrop that contains the duct for the inlet and outlet of air (see, e.g., 18BLL), as well as rotor blades and a motor that are both mounted inside the duct.

Each of the ducted fans has a unique three-letter designation that describes their locations on the hull 24 as seen from standing behind the stern of the airship (see FIGS. 3A and 3B). The ducted fans 17 near the bow have the following designations:
BUR: Bow Upper Right
BUL: Bow Upper Left
BLR: Bow Lower Right
BLL: Bow Lower Left The ducted fans 19 near the stern have the following designations:
SUR: Stern Upper Right
SUL: Stern Upper Left
SLR: Stern Lower Right (see FIG. 3A)
SLL: Stern Lower Left There are four identical fins 21 with rudders (not shown) which are mounted on the streamlined housings of the ducted fans 19 near the stern. The advantage of mounting the fins 21 directly onto the streamlined housings is that the housings are serving the additional purpose of supplying a rigid mounting surface with a larger surface area resting on the hull 24 than the cross-section of the fins 21 would supply. This way tensioning ropes between the fins and the hull, like they are common in the prior art, can be omitted and the drag forces that these ropes would cause in flight do not occur. Furthermore, there is a gondola 22 attached to the bottom of the hull 24 and a sensor 23 attached to the gondola 22.

Figure 2:
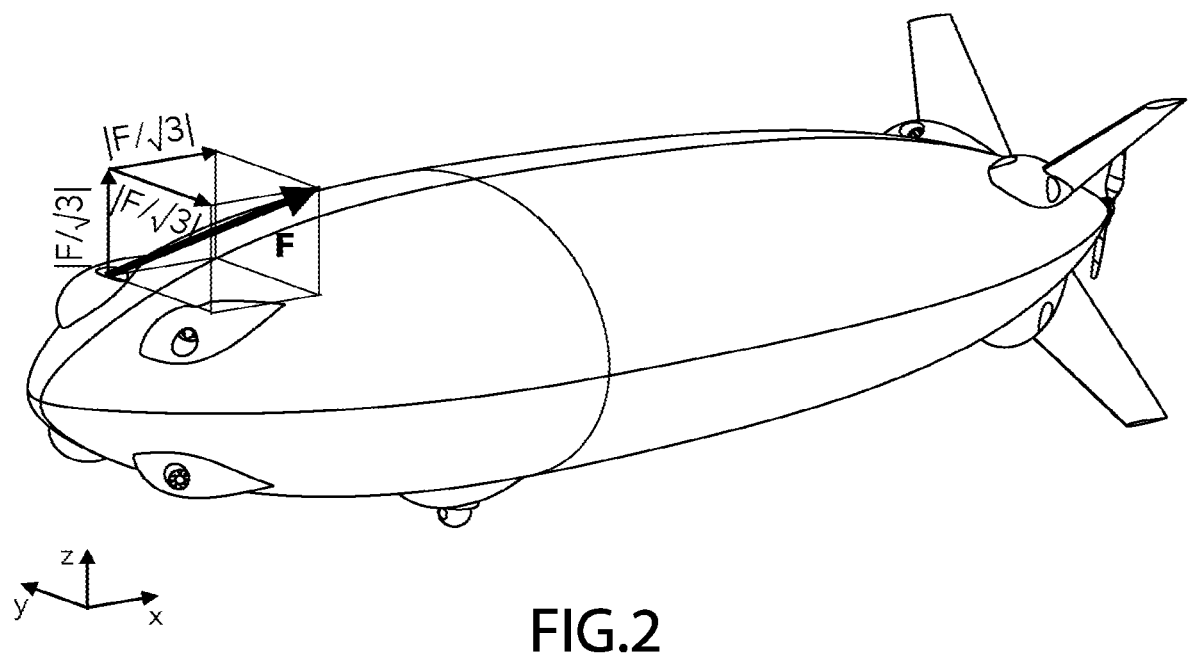
FIG. 2 is a perspective view of the airship of FIG. 1 illustrating the thrust vector F of one of the eight ducted fans in its three dimensional orientation and its projections in x, y and z direction each have a magnitude $|F/\sqrt{3}|$.

In FIG. 2, the thrust vector F of the ducted fan 17BUR is shown as an arrow pointing from the outlet of the ducted fan housing in the direction into which the air is blown by that ducted fan. Each thrust vector points in one of the eight possible directions from $\{-1,1\}^3$. In other words, the thrust vector F can be decomposed into three vectors of length $|F/\sqrt{3}|$ (F divided by the square root of 3) that are each parallel to one of the three axes of a Cartesian coordinate system like defined in the lower left corner of FIG. 2. As the arrangement of ducted fans 17 and 19 is symmetrical, each ducted fan is positioned and oriented symmetrically to 17BUR. This again means that the thrust vector F of each ducted fan 17 and 19 can be decomposed into three components that act in the three directions of a Cartesian coordinate system and that have the same magnitude $|F/\sqrt{3}|$.

FIG. 3A shows the four ducted engines 19SUL, 19SUR, 19SLL and 19SLR located near the stern of the airship. As may be seen in FIG. 3A, engine 19SUL is located at the upper left quarter of the stern, engine 19SUR is located in the upper right quarter of the stern, engine 19SLL is located at the lower left quarter of the stern, and engine 19SLR is located at the lower right quarter of the stern.

FIG. 3B shows the four ducted engines 17BUR, 17BUL, 17BLR and 17BLL located near the bow of the airship. As may be seen in FIG. 3B, engine 17BUR is located at the upper right quarter of the bow, engine 17BUL is located in the upper left quarter of the bow, engine 17BLR is located at the lower right quarter of the bow, and engine 17BLL is located at the lower left quarter of the bow.

FIG. 4A shows a side view of the airship with one upper and one lower ducted engine located near the bow of the airship and one upper and one lower ducted engine located near the stern of the airship.

FIG. 4B shows a top view of the airship with two upper ducted engines located near the bow of the airship and two upper ducted engines located near the stern of the airship.

FIG. 5A shows two of the four thrust vectors that are necessary to move the airship to the left, i.e., in the direction −y of the Cartesian coordinate system. The ducted fans activated for this movement are 17BUL, 17BLL, 19SUL and 19SLL, as seen in FIGS. 1 and 3A.

FIG. 5B shows two of the four thrust vectors that are necessary to move the airship to the right, i.e., in the direction y of the Cartesian coordinate system. The ducted fans activated for this movement are 17BUR, 17BLR, 19SUR and 19SLR, as seen in FIGS. 1 and 3A.

FIG. 6A shows two of the four thrust vectors that are necessary to move the airship backwards, i.e., in the direction x of the Cartesian coordinate system. The ducted fans activated for this movement are 19SUL, 19SUR, 19SLL and 19SLR, as seen in FIGS. 1 and 3A.

FIG. 6B shows two of the four thrust vectors that are necessary to move the airship forwards, i.e., in the direction −x of the Cartesian coordinate system. The ducted fans activated for this movement are 17BUL, 17BUR, 17BLL and 17BLR, as seen in FIGS. 1 and 3A.

Figure 7A:
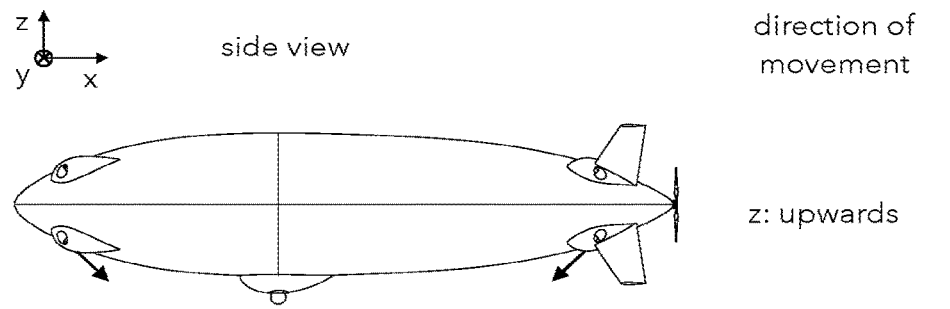
FIGS. 7A and 7B are side views of the airship of FIG. 1 illustrating the active engines for the upwards and downwards movement, respectively.

FIG. 7A shows two of the four thrust vectors that are necessary to move the airship upwards, i.e., in the direction z of the Cartesian coordinate system. The ducted fans activated for this movement are 17BLL, 17BLR, 19SLL and 19SLR, as seen in FIGS. 1 and 3A.

Figure 7B:
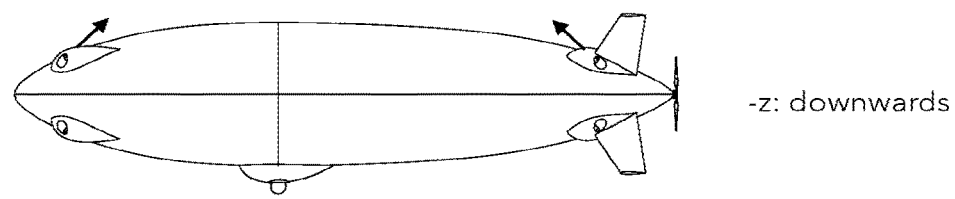

FIG. 7B shows two of the four thrust vectors that are necessary to move the airship downwards, i.e., in the direction −z of the Cartesian coordinate system. The ducted fans activated for this movement are 17BUL, 17BUR, 19SUL and 19SUR, as seen in FIGS. 1 and 3A.

Figure 8A:
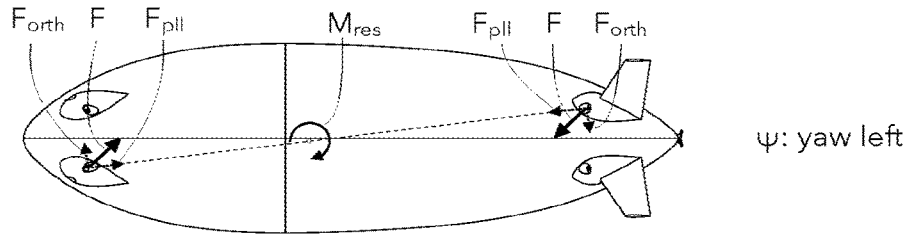
FIGS. 8A and 8B are top views of the airship of FIG. 1 illustrating the active engines for the yaw movement to the left and to the right, respectively.

FIG. 8A shows two of the four thrust vectors that are necessary to yaw the airship to the left, i.e., rotate it around the z-axis of a Cartesian coordinate system, whose origin is located near the center of the airship hull 24, in the direction of $\psi$ (psi). The ducted fans activated for this movement are 17BUL, 17BLL, 19SUR and 19SLR, as seen in FIGS. 1 and 3A.

Figure 8B:
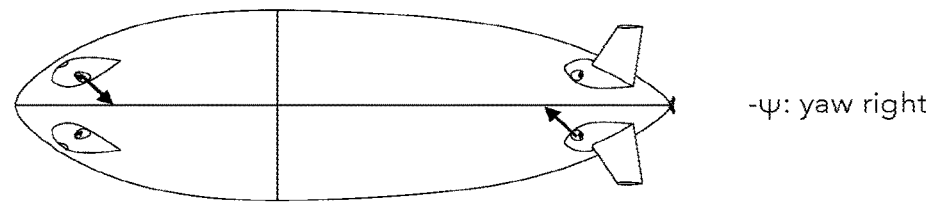

FIG. 8B shows two of the four thrust vectors that are necessary to yaw the airship to the right, i.e., rotate it around the z-axis of a Cartesian coordinate system, whose origin is located near the center of the airship hull 24, in the direction of $-\psi$ (minus psi). The ducted fans activated for this movement are 17BUR, 17BLR, 19SUL and 19SLL, as seen in FIGS. 1 and 3A.

Figure 9A:
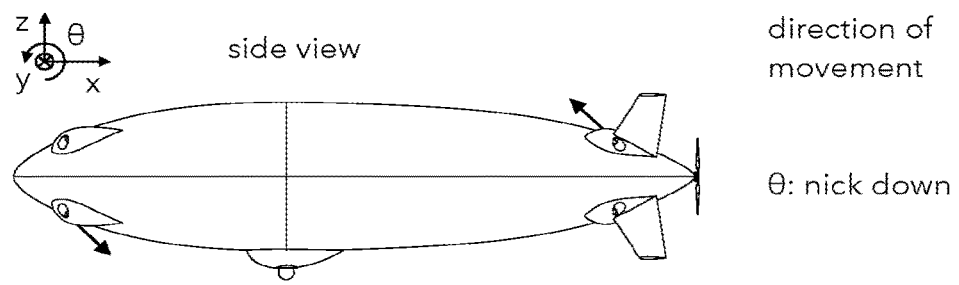
FIGS. 9A and 9B are side views of the airship of FIG. 1 illustrating the active engines for the movements pitch down and pitch up, respectively.

FIG. 9A shows two of the four thrust vectors that are necessary to pitch the airship down, i.e., rotate it around the axis that is parallel to the y-axis and goes approximately through the center of gravity of the airship in the direction of $\theta$ (theta). The ducted fans activated for this movement are 17BLL, 17BLR, 19SUL and 19SUR, as seen in FIGS. 1 and 3A.

Figure 9B:
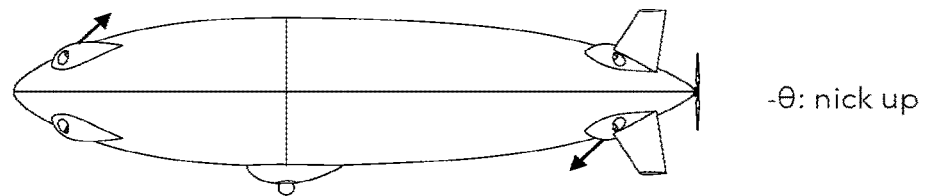

FIG. 9B shows two of the four thrust vectors that are necessary to pitch the airship up, i.e., rotate it around the axis that is parallel to the y-axis and goes approximately through the center of gravity of the airship in the direction of $-\theta$ (minus theta). The ducted fans activated for this movement are 17BUL, 17BUR, 19SLL and 19SLR, as seen in FIGS. 1 and 3A.

Figure 10A:
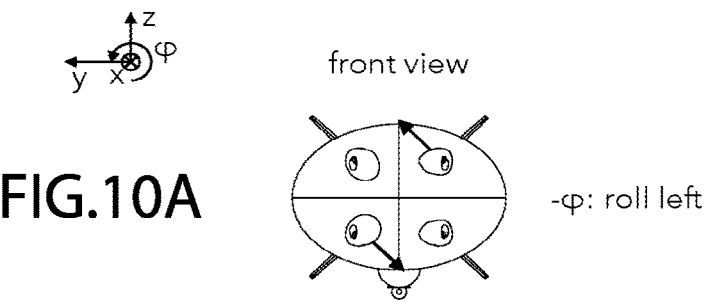
FIGS. 10A and 10B are front views of the airship of FIG. 1 illustrating the active engines for the roll movements to the left and to the right, respectively.

FIG. 10A shows two of the four thrust vectors that are necessary to roll the airship left, i.e., rotate it around the axis that is parallel to the x-axis and goes approximately through the center of gravity of the airship in the direction of $-\varphi$ (minus phi). The ducted fans activated for this movement are 17BUL, 17BLR, 19SUL and 19SLR, as seen in FIGS. 1 and 3A.

Figure 10B:
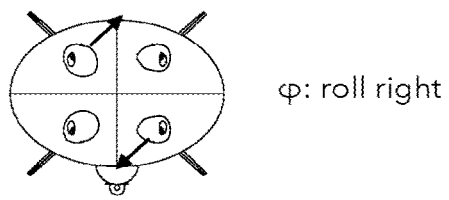

FIG. 10B shows two of the four thrust vectors that are necessary to roll the airship right, i.e., rotate it around the axis that is parallel to the x-axis and goes approximately through the center of gravity of the airship, in the direction of $\varphi$ (phi). The ducted fans activated for this movement are 17BUR, 17BLL, 19SUR and 19SLL, as seen in FIGS. 1 and 3A.

Operation

An embodiment of the propulsion system enables two flight modes: a cruise mode and a hover mode, which are explained in detail below.

Cruise Mode

In the cruise mode, the airship is propelled in the forward direction by the stern engine 20. Maneuvering is accomplished by deflecting the rudders of the fins 21. Compared to using the ducted fans 19, this enables a very energy efficient flight for the following reasons:

- The stern propeller rotates around the longitudinal axis (parallel to the x-axis) so that its thrust vector is completely used for forward propulsion.
- The propulsion efficiency of the stern propeller is increased by wake effects at the stern.
- The stern propeller can have a rather large diameter without having to mount it on a structure that would have to prevent it from interfering with the hull. A large diameter for the stern propeller is advantageous because it can rotate slower than a smaller-diameter propeller while producing the same amount of thrust. Motors with a lower rpm/V (revolutions per minute per Volt) can be used at a higher voltage, which leads to a lower current draw. The lower current draw leads to a smaller voltage drop and to smaller heat losses across the motor wires, which ultimately enables a more efficient operation.
- Maneuvering by using the rudders is more energy efficient compared to using propeller thrust, because comparably small servo motors are sufficient to actuate the rudders. These only have to be actuated from time to time to correct the flight path and do only consume relatively little energy.

Hover Mode

In the hover mode, the airship is propelled by the eight ducted fans 17 and 19 and optionally also the stern engine 20. At every time in this mode, all engine speeds are chosen such that all forces acting on the airship (i.e., engine thrusts, gravity, buoyancy, wind and potentially others) are together resulting in the desired motion. A video of a working prototype for the hover mode can be found on the Youtube channel of aerobotX Inc., e.g., under the title "ObliX mini with Computer Vision."

Advanced Motion Control

In broadest terms, the propulsion system relies on two techniques to achieve the desired motion: First, a (mathematical) model that describes the relationship between engine thrusts and the resulting motion. Second, a closed-loop (feedback) control system that compensates for model inaccuracies relative to the real world.

For purposes of illustration, two examples for both techniques are described:

1. First, a rigid airship (but also a blimp with a fully inflated hull) as a rigid body that behaves according to the laws of classical mechanics may be modeled. In classical mechanics, movement of a rigid body has six degrees of freedom: That is, any motion can be decomposed into its translational part (consisting of three components, for x/y/z-axis) and its rotational part (consisting again of three components, for roll/pitch/yaw about a fixed local axis, typically chosen as running through the center of gravity). Translational acceleration is determined by Newton's second law of motion ("F=m·a"), and rotational acceleration is determined by its angular analog, plus Euler's equations. Thus, by solving a system of equations, the necessary engine thrusts can be computed from the desired acceleration. The system of equations is guaranteed to have a solution in all directions because there are 8 engines, but only 6 degrees of freedom.

2. Second, a well-known technique for a closed-loop control system is a PID controller. There could be six PID controllers on the airship, one each for controlling longitudinal velocity, lateral velocity, vertical velocity, yaw velocity, roll, and pitch.

Such an implementation may be chosen if computer-supported flight control and avionics are desired, and if there is sufficient computer power to continuously solve systems of equations in real time.

Simplified Motion Control

In an environment where microcontrollers are either not feasible or not desirable, simpler implementations of both model and control system are possible. For instance:

1. First, a less precise model may be chosen where desirable symmetries are just assumed to be present. For instance, one could assume that equal thrusts in the upper stern and lower stern engines entirely cancels out any torque. While this is clearly a simplifying assumption, with no chance of precisely describing the real-world behavior, it may in some use cases be sufficiently close to the real-world behavior.

2. Second, the "control system" may as well be embodied by a human pilot.

The figures herein are presented with this simple implementation of the control system in mind.

Advantages of Ducted Fans

In the first embodiment of the propulsion system, ducted fans are used instead of big propellers because their small size does not cause much additional air resistance and their housing guards the fans from interference with objects or people. In addition, a vortex ring around the tip of the fan blades is avoided by the operation in the duct, thus making propulsion more efficient.

Guarding the fans is more important than guarding the stern propeller because the ducted fans are used when precise maneuvering is necessary in confined spaces, close to objects or people. In such a situation the stern propeller can be switched off in order to reduce the risk of damage or injury.

Operation of Ducted Fans

The maneuverability in all directions is achieved by the orientation of the ducted fans 17 and 19. The stern engine 20 can be helpful with station keeping or moving against the wind, especially when the bow of the airship is pointing against the direction of the wind.

As shown in the example for one ducted fan in FIG. 2, the thrust vector F produced by the ducted fan is pointing in the direction of the airflow and is oriented in such a way that it has a component in every direction x, y and z of a Cartesian coordinate system. In this embodiment, all components have the same magnitude $|F/\sqrt{3}|$ (F divided by the square root of 3). The eight thrust vectors F of the eight ducted fans are arranged symmetrically such that a combination of running fans can be found in which two of the three components x, y, z of the thrust vectors F cancel each other out while the third components add up in a resulting thrust vector. FIGS. 5A-5B, 6A-6B, 7A-7B, 8A-8B, 9A-9B, and 10A-10B show these combinations for every direction x, y and z, as well as for every rotation $\psi$, $\varphi$ and $\theta$ (psi, phi and theta), as defined by the coordinate system in the respective figures. In addition to the figure descriptions above, one translational and one rotational movement will be explained in detail hereinbelow.

As shown in FIG. 5A, in order for the airship to move left, i.e., in the direction −y, the ducted fans 17BUL, 17BLL, 19SUL and 19SLL are activated to produce a force of magnitude $|F_{res}|$. The x-components of 17BUL and 19SUL, as well as the x-components of 17BLL and 19SLL, act in opposite directions and cancel each other out. The z-components of 17BUL and 17BLL, as well as 19SUL and 19SLL, also act in opposite directions and cancel each other out. The y-components of 17BUL, 17BLL, 19SUL and 19SLL all act in the same direction and add up to a resulting thrust of magnitude $F_{res}=4*|F/\sqrt{3}|$ (4 times F divided by the square root of 3), which points in the direction parallel to the y-axis. The symmetry of the airship design ensures that this resulting thrust introduces only negligible rotation.

As shown in FIG. 8A, in order for the airship to rotate around its vertical axis, i.e., in the direction of $\psi$ (psi) around an axis parallel to the z-axis, the ducted fans 17BUL, 17BLL, 19BUR and 19BLR are activated. Their thrust vectors F can each be written as the sum of three orthogonal vectors $F_{pll}$, $F_{orth}$ and $F_z$ where:

$F_{pll}$ is pointing in the direction of the dotted line that connects 17BUL and 19SUR on the top and 17BLL and 19SLR on the bottom of the airship respectively (not shown).

$F_{orth}$ is pointing in the direction that is orthogonal to $F_{pll}$ in the xy-plane.

$F_z$ is pointing in the direction of the z-axis (not shown).

The thrust vectors $F_z$ of 17BUL and 17BLL, as well as the thrust vectors $F_z$ of 19BUR and 19BLR, cancel each other out. The thrust vectors $F_{pll}$ of 17BUL and 19SUR, as well as the thrust vectors $F_{pll}$ of 17BLL and 19SLR, cancel each other out. Only the thrust vectors $F_{orth}$ remain and add up to the resulting momentum of rotation $M_{res}$ (see FIG. 8A) around an axis that is parallel to the z-axis and goes through the center of the airship.

The movements described above are the elementary movements along and about the three axes of the Cartesian coordinate system. The translations in all other directions and the rotations about all other axes are achieved by the linear combination of the elementary movements.

For example, if the thrust vectors for the upwards movement (see FIG. 7A) and the thrust vectors for the forward movement (see FIG. 6B) are combined, the resulting movement will be both upward and forward, with the airship staying level.

Symmetry Conditions

The symmetrical arrangement of ducted fans 17 at the bow and ducted fans 19 at the stern (compared to only having engines at the stern or at the bow) in the embodiment described above serves the purpose of preventing a rotation about the center z-axis of the airship for thrust in the y-direction, as well as a rotation about the center y-axis of the airship for thrust in the z-direction.

CONCLUSION

Accordingly, the proposed propulsion system of the present invention enables an airship to move in all six degrees of freedom, as well as hold a defined position and orientation. This is possible even in windy conditions. The fixed direction of thrust for every engine allows for a near-instantaneous reaction to the control commands because only the magnitude of thrust has to be adjusted. This is much faster than having to swivel an engine, more energy efficient than having to redirect the direction of thrust by mechanical means, like blinds or ducts, and mechanically simpler and thus more reliable compared to swiveling an engine, blinds, ducts or the blades of a propeller.

One embodiment of the present invention also enables an efficient forward flight by an additional engine at the stern of the airship and the use of conventional rudders. This way, a so-called "Hover Mode," like known from helicopters, and a so-called "Cruise Mode," like known from airplanes, can both be combined in order to achieve long flight times and high maneuverability with one aircraft.

While the above description of the present invention contains many specificities, these should not be construed as limitations on the scope, but rather as an exemplification of one embodiment thereof. Many other variations are possible. For example:

1. The airship can have an arbitrary shape as long as engines can be arranged such that the thrusts of the combined engines can produce any required resulting force and torque. To achieve full 6-degree-of-freedom movement, this means at least 6 engines with sufficiently different thrust vectors (due to well-known results from linear algebra), as discussed hereinabove.
2. A ducted stern propeller can be used for increased efficiency and safety.
3. The thrust vectors of the ducted fans can point into different directions, i.e., individually, in groups or all of them. This way different magnitudes for the x, y and z components of the thrust vectors will lead to different resulting forces in the directions of movement.
   3.1. For example, if the y-component of all thrust vectors of the ducted fans 17 and 19 is increased in the same way, then the resulting force for the movement in the y-direction will be bigger while the resulting force in the x and/or the z directions will be smaller.
   3.2. Another example could be to increase the y-components of the thrust vectors only for the four ducted fans 19 at the stern. This could improve movement in the lateral direction by taking into account that the lateral drag at the stern is bigger than at the bow because of the empennage. A more balanced movement would be the result. The direction of the thrust vector of a ducted fan is only limited by the hull. Expelled air should not hit the hull or flow in close proximity to it in order to avoid surface-induced disturbances of the air flow.
   3.3. As a last example, the direction of all thrust vectors can be inverted. This would help avoiding the Coandă-Effect by leading the expelled air away from the hull better because the vectors would point away from it rather than over it.
4. The eight engines 17 and 19 do not have to be ducted fans and the stern engine does not have to be a propeller. Any other kind and size of engines can also be used. The importance lies in the fixed direction of the thrust vectors of all engines.
5. The stern engine 20 can be omitted, especially when efficient forward flight is not required.
6. The rudders on the fins 21 can be omitted and turning of the airship can be initiated by the ducted fans 17 and 19 only. On the one hand, this would require more energy but, on the other hand, it would also reduce weight for the rudders and their actuation.
7. The fins 21 of the airship can be omitted. In this embodiment, the ducted fans 17 and 19 would replace the function of the fins 21 and stabilize the airship. On the one hand, this would reduce the drag force induced by the fins 21 and save weight. On the other hand, it would increase the energy consumption in most practical flight situations because the passive fins can be more efficient in stabilizing the airship in the direction of flight than active propulsion means.
8. In a combination of embodiments 5 and 7 above, stern engine 20 and fins 21 can be omitted. In this embodiment, the ducted fans 17 and 19 would cause and stabilize the movement of the airship. This is the most energy demanding mode of all embodiments proposed.
9. For a simplified flight control, as described above in relation to the "Hover Mode," the position of the eight ducted fans can be varied as long as the symmetry conditions described above are maintained.
10. The at least one engine producing thrust in the longitudinal (forward) direction of the airship and embodied by the stern engine 20 in the first embodiment can be mounted to different positions on the airship in further embodiments:
    10.1. A bow engine could replace stern engine 20.
    10.2. In addition to the stern engine 20, an engine at the airship's bow tip can be used in order to increase forward thrust and flight stability.
    10.3. At least one engine could be mounted to the gondola 22 of the airship.
    10.4. At least one engine could be mounted to a position along the hull 24 of the airship.

In view of the foregoing, the scope of the embodiments of the present invention should be determined by the appended claims and their legal equivalents, rather than by the examples illustrated and described above.

I claim:

1. A propulsion system for an airship that enables movement of the airship in six degrees of freedom, comprising:
   at least six engines rigidly attached to a hull of the airship, wherein each of the at least six engines has a thrust vector pointing in one fixed direction,
   wherein the at least six thrust vectors are fixedly oriented in a way that the magnitude of their thrust can be chosen such that all forces acting on the airship together result in motion in the six degrees of freedom, and wherein at least one of the engines is a ducted fan mounted inside a streamlined housing shaped as a half-teardrop.

2. The propulsion system of claim 1, wherein the number of engines is eight.

3. The propulsion system of claim 2,
wherein the hull has a bow, a stern and a radial circumference,
wherein the eight engines are arranged around the radial circumference of the hull, and
wherein four of the eight engines are located closer to the bow of the airship and the other four of the eight engines are located closer to the stern of the airship.

4. The propulsion system of claim 3, wherein the four engines located closer to the bow of the airship comprise:
one engine located at an upper right quarter of the bow with its thrust vector pointing in the direction with vector components x=a*1, y=b*-1, z=c*1, relative to a Cartesian coordinate system having x, y and z axes,
one engine located at an upper left quarter of the bow with its thrust vector pointing in the direction with vector components x=a*1, y=b*1, z=c*1, relative to the Cartesian coordinate system,
one engine located at a lower right quarter of the bow with its thrust vector pointing in the direction with vector components x=a*1, y=b*-1, z=c*-1, relative to the Cartesian coordinate system, and
one engine located at a lower left quarter of the bow with its thrust vector pointing in the direction with vector components x=a*1, y=b*1, z=c*-1, relative to the Cartesian coordinate system,
where the x-axis points parallel to a longitudinal axis of the airship towards the stern of the airship, the y-axis points parallel to a lateral axis of the airship towards a right side in a direction of forward travel and the z-axis points parallel to a vertical axis of the airship towards an upper side of the airship, and where symbol * expresses an arithmetic multiplication and characters a, b, c, d, e, and f represent rational numbers that can be positive or negative but not zero.

5. The propulsion system of claim 3, wherein the four engines located closer to the stern of the airship comprise:
one engine located at an upper right quarter of the stern with its thrust vector pointing in the direction with vector components x=d*-1, y=e*-1, z=f*1, relative to a Cartesian coordinate system having x, y and z axes,
one engine located at an upper left quarter of the stern with its thrust vector pointing in the direction with vector components x=d*-1, y=e*1, z=f*1, relative to the Cartesian coordinate system,
one engine located at a lower right quarter of the stern with its thrust vector pointing in the direction with vector components x=d*-1, y=e*-1, z=f*-1, relative to the Cartesian coordinate system, and
one engine located at a lower left quarter of the bow with its thrust vector pointing in the direction with vector components x=d*-1, y=e*1, z=f*-1, relative to the Cartesian coordinate system,
where the x-axis points parallel to a longitudinal axis of the airship towards the stern of the airship, the y-axis points parallel to a lateral axis of the airship towards a right side in a direction of forward travel and the z-axis points parallel to a vertical axis of the airship towards an upper side of the airship, and where symbol * expresses an arithmetic multiplication and characters a, b, c, d, e, and f represent rational numbers that can be positive or negative but not zero.

6. The propulsion system of claim 1,
wherein the hull has a stern with four fins, and
wherein the streamlined housing is located at the stern of the airship and serves as mounting and stabilization means for one of the four fins.

7. The propulsion system of claim 1, wherein at least one engine of the at least six engines has its thrust vector approximately oriented in the direction of forward flight to provide an efficient flight in the forward direction.

8. The propulsion system of claim 7,
wherein the hull has a stern,
wherein the at least one engine having its thrust vector approximately oriented in the direction of forward flight is at the stern of the airship.

9. A propulsion system for an airship, comprising:
nine engines rigidly attached to a hull of the airship,
wherein eight engines are ducted fans with rotor blades and the ninth engine has a propeller with a larger diameter than the blades of the ducted fans,
wherein each of the ducted fans has a thrust vector pointing in one fixed direction,
wherein the hull includes a bow, a stern and a radial circumference,
wherein the ducted fans are attached to the hull of the airship such that four of the ducted fans are located closer to the bow of the airship and the other four of the ducted fans are located closer to the stern of the airship,
wherein all of the ducted fans are equally distributed around the radial circumference of the hull such that, in each quarter of the radial circumference of the hull, one of the ducted fans is closer to the bow and one of the ducted fans is closer to the stern of the airship,
wherein the ninth engine is mounted to the stern of the airship and has a thrust vector approximately pointing in a direction (x, y, z)=(1, 0, 0) relative to a Cartesian coordinate system of the airship having x, y and z axes, and
wherein the x-axis points parallel to a longitudinal axis of the airship towards the stern of the airship, the y-axis points parallel to a lateral axis of the airship towards a right side in a direction of forward travel and the z-axis points parallel to a vertical axis of the airship towards an upper side of the airship.

10. The propulsion system of claim 9,
wherein the four ducted fans located closer to the bow of the airship comprise:
one ducted fan located at an upper right quarter of the bow with its thrust vector approximately pointing in the direction (x, y, z)=(a*1, b*-1, c*1), relative to a Cartesian coordinate system of the airship having x, y and z axes,
one ducted fan located at an upper left quarter of the bow with its thrust vector approximately pointing in the direction (x, y, z)=(a*1, b*1, c*1), relative to the Cartesian coordinate system of the airship,
one ducted fan located at a lower right quarter of the bow with its thrust vector approximately pointing in the direction (x, y, z)=(a*1, b*-1, c*-1), relative to the Cartesian coordinate system of the airship, and
one ducted fan located at a lower left quarter of the bow with its thrust vector approximately pointing in the direction (x, y, z)=(a*1, b*1, c*-1), relative to the Cartesian coordinate system of the airship,
wherein the four ducted fans located closer to the stern of the airship comprise:
one ducted fan located at an upper right quarter of the stern with its thrust vector approximately pointing in the direction (x, y, z)=(d*−1, e*−1, f*1), relative to the Cartesian coordinate system of the airship,
one ducted fan located at an upper left quarter of the stern with its thrust vector approximately pointing in the direction (x, y, z)=(d*−1, e*1, f*1), relative to the Cartesian coordinate system of the airship,
one ducted fan located at a lower right quarter of the stern with its thrust vector approximately pointing in the direction (x, y, z)=(d*−1, e*−1, f*−1), relative to the Cartesian coordinate system of the airship, and
one ducted fan located at a lower left quarter of the bow with its thrust vector approximately pointing in the direction (x, y, z)=(d*−1, e*1, f*−1), relative to the Cartesian coordinate system of the airship,
where the x-axis points parallel to a longitudinal axis of the airship towards the stern of the airship, the y-axis points parallel to a lateral axis of the airship towards a right side in a direction of forward travel and the z-axis points parallel to a vertical axis of the airship towards an upper side of the airship, and where * is the symbol for a multiplication, and characters a, b, c, d, e, and f are rational numbers that can be positive or negative but not zero.

11. The propulsion system of claim 10, wherein the rational numbers b and e each take the value −2 and the rational numbers a, c, d, and f each take the value −1.

12. The propulsion system of claim 9, wherein the ducted fans are attached to the hull by being mounted inside housings and the housings are shaped in a way that reduces housing drag force in a direction of forward flight.

13. The propulsion system of claim 12,
wherein the stern of the airship has four fins, and
wherein each of the housings located at the stern of the airship serves as mounting and stabilization means for one of the fins.

14. A propulsion system for an airship, comprising:
at least six engines rigidly attached to the airship, and
at least six thrust vectors of the engines fixedly oriented in a way that the magnitude of their thrust can be chosen such that all forces acting on the airship are together resulting in any desired motion in six degrees of freedom,
wherein at least one of the engines is a ducted fan mounted inside of a housing located at a stern of the airship, and
wherein the airship includes four fins and the housing located at the stern of the airship serves as mounting and stabilization means for one of the four fins.

15. A propulsion system for an airship that enables movement of the airship in six degrees of freedom, comprising:
at least six engines rigidly attached to a hull of the airship,
wherein each of the at least six engines has a thrust vector pointing in one fixed direction,
wherein the at least six thrust vectors are fixedly oriented in a way that the magnitude of their thrust can be chosen such that all forces acting on the airship together result in motion in the six degrees of freedom,
wherein the number of engines is eight,
wherein the hull has a bow, a stern and a radial circumference,
wherein the eight engines are arranged around the radial circumference of the hull,
wherein four of the eight engines are located closer to the bow of the airship and the other four of the eight engines are located closer to the stern of the airship,
wherein the four engines located closer to the bow of the airship comprise:
one engine located at an upper right quarter of the bow with its thrust vector pointing in the direction with vector components x=a*1, y=b*−1, z=c*1, relative to a Cartesian coordinate system having x, y and z axes,
one engine located at an upper left quarter of the bow with its thrust vector pointing in the direction with vector components x=a*1, y=b*1, z=c*1, relative to the Cartesian coordinate system,
one engine located at a lower right quarter of the bow with its thrust vector pointing in the direction with vector components x=a*1, y=b*−1, z=c*−1, relative to the Cartesian coordinate system, and
one engine located at a lower left quarter of the bow with its thrust vector pointing in the direction with vector components x=a*1, y=b*1, z=c*−1, relative to the Cartesian coordinate system, and
wherein the four engines located closer to the stern of the airship comprise:
one engine located at an upper right quarter of the stern with its thrust vector pointing in the direction with vector components x=d*−1, y=e*−1, z=f*1, relative to the Cartesian coordinate system,
one engine located at an upper left quarter of the stern with its thrust vector pointing in the direction with vector components x=d*−1, y=e*1, z=f*1, relative to the Cartesian coordinate system,
one engine located at a lower right quarter of the stern with its thrust vector pointing in the direction with vector components x=d*−1, y=e*−1, z=f*−1, relative to the Cartesian coordinate system, and
one engine located at a lower left quarter of the bow with its thrust vector pointing in the direction with vector components x=d*−1, y=e*1, z=f*−1, relative to the Cartesian coordinate system,
where the x-axis points parallel to a longitudinal axis of the airship towards the stern of the airship, the y-axis points parallel to a lateral axis of the airship towards a right side in a direction of forward travel, and the z-axis points parallel to a vertical axis of the airship towards an upper side of the airship, and where symbol * expresses an arithmetic multiplication and characters a, b, c, d, e, and f represent rational numbers that can be positive or negative but not zero.

16. The propulsion system of claim 15, wherein the rational numbers a, c, d, and f take the value −1 and the rational numbers b and e take the value −2.

* * * * *